INVENTORS
MAINEARD L. SMITH
JAMES D. TATE
BY J.B. Holden
ATTORNEY

United States Patent Office 3,085,616
Patented Apr. 16, 1963

3,085,616
TIRE WITH WIDE CORD PLY
Maineard L. Smith and James D. Tate, Akron, Ohio, assignors to The Goodyear Tire & Rubber Company, Akron, Ohio, a corporation of Ohio
Filed July 10, 1961, Ser. No. 125,633
2 Claims. (Cl. 152—355)

This invention relates to a pneumatic tire which includes at least one wide cord ply which extends from bead to bead, with its edges turned up outside of the beads and extending back up toward the crown of the tire. The invention will be described more particularly in connection with a tire with one such wide cord ply.

The turned-up edges of the wide cord play do not meet one another at the crown of the tire. There is a gap between them. At the crown of the tire, in contact with the edges of the wide cord ply, there is at least one rubber ply which contains short lengths of filamentary material. This filamentary material imparts better stone-cut resistance and cut-and-crack-growth resistance to the tire.

When short lengths of wire are used as the filamentary material their ends are anchored in both edges of the wide ply and in the central underlying portions of the wide ply and hold the turned-up edges of the wide ply in place. Such short lengths of wire are preferably coated with brass to form a good bond with the rubber when the tire is vulcanized. Other filamentary materials that can be used include short lengths of cotton cords and the like, filaments or flock of nylon, rayon, polyester, etc. These short lengths are preferably ⅛ to ¾ inch long, but may be somewhat longer. Wire lengths greater than about ½ or ¾ inch tend to become bent or crinkled in the mill and are not orientated to the extent that shorter lengths are, but can be used. It is not necessary that the wire lengths be straight.

This general construction may be used in a passenger tire, a bus or truck tire, an industrial tire, etc. It lends itself well to construction by automatic (or semi-automatic) machinery. The reinforcement by filamentary material is particularly useful in tires apt to encounter objects which may cut or bruise them, such as trash material encountered on the floor of a plant or on the highway, etc.

The reinforcing ply which contains the short lengths of filamentary material can be incorporated in the tire as a calendered sheet placed over the two edges of the wide ply and across the gap between them, or it can be located under these edges—that is, between both of these edges and the underlying continuous expanse of this wide ply. A reinforcing ply which contains short lengths of wire can be located in both of these places. The gap between the two edges of the wide ply can be filled by a separate narrow ply which contains short lengths of wire. Alternatively, a wider ply which contains the short lengths of wire can be thicker in approximately the area of the gap. The reinforcing ply may extend to the shoulders of the tire to give extra strength to the tire in addition to bonding the two edges of the cord ply together.

This reinforcing ply or plies will be incorporated in the tire in the manner usually employed in tire building.

The filamentary material may be added to the rubber stock on the mill, or may be distributed throughout the width of a sheet of rubber as it is fed to a calender or mixed with the rubber stock as it is supplied to an extruder. If the short lengths of filamentary material are perfectly straight or generally linear, although possibly crinkled, they will become aligned or orientated in the tire during calendering or extruding, or in prior milling, and the orientation will be in the direction in which the stock is calendered, etc. Generally, such a reinforcing ply will be incorporated in the tire with the filamentary material orientated at an angle to the centerline of the tread, or in a bead-to-bead direction to aid in binding the turned-up edges of the ply together. If lengths of bent or crinkled wire are used, ordinarily they will not be orientated to the same extent as straight lengths or lengths of textile material. Orientation is not essential.

Short lengths of wire are preferred to other filamentary material because when mixed with rubber their ends tend to protrude from the rubber so that the ply is prickly to the touch. When pressure is applied during the manufacture of the tire the ends of the wires in different portions of the ply or plies become anchored in the edges of the wide ply and in the underlying portion of the wide ply. This prevents slippage between them.

The invention is further described in connection with the accompanying drawings, in which—

Figure 1:
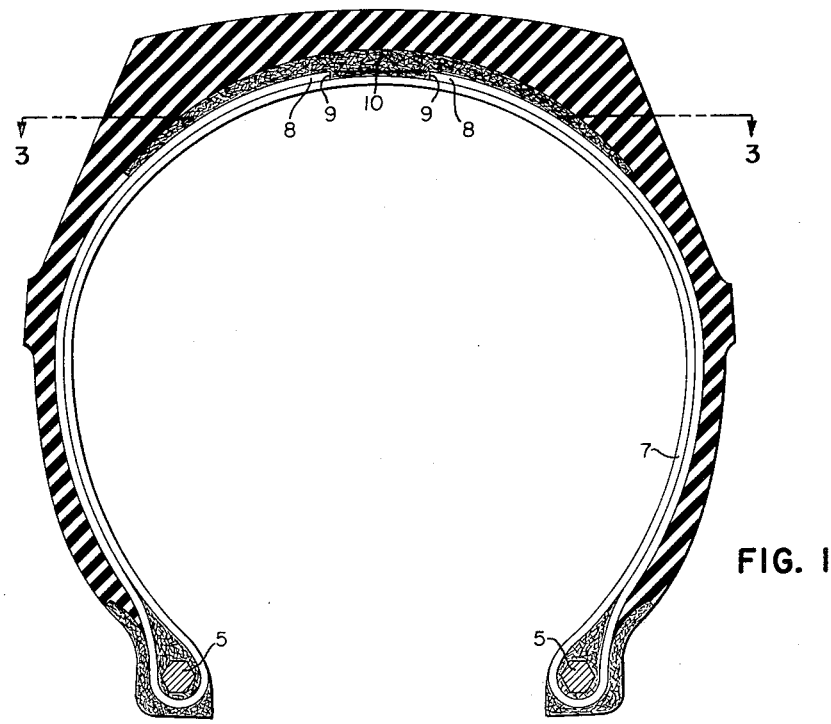
FIG. 1 is a radial section through a tire in which the ends of the wide cord ply do not come together, and located over the turned-up edges of the cord ply there is a rubber ply which contains short lengths of wire.

The drawings are quite schematic, and illustrate either a green tire or cured tire. The tire of FIGURE 1 includes beads 5 and a single cord play which forms an inner ply 7 extending from bead to bead. Its edges 8 are turned up outwardly of the beads and extend outside the inner ply 7 to the crown of the tire where there is a substantial gap between them. The width of the gap will vary, and even when this wide ply is cut to a uniform width there is some variance in the width of the gap in production. For instance, if a narrow gap is contemplated the edges may on occasion abut one another.

Figure 3:
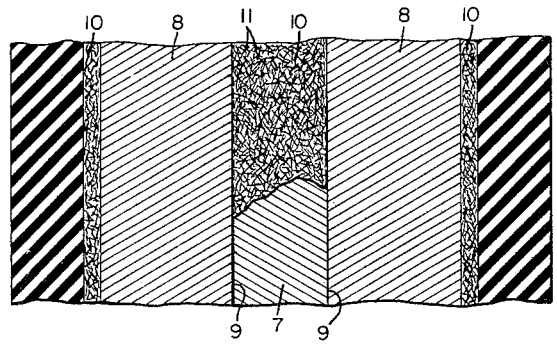
FIG. 3 is a section on the line 3—3 of FIGURE 1.

The cords in the wide ply are preferably biased, and in that case the cords in the portions 7 and 8 cross one another, as clearly illustrated in FIGURE 3. The edges 9 of the wide cord ply are covered by the ply 10 which includes short lengths of filamentary material 11. The wire ends anchor themselves in the central part of the portion 7 of the wide ply as well as in the edge portions 8.

Figure 2:
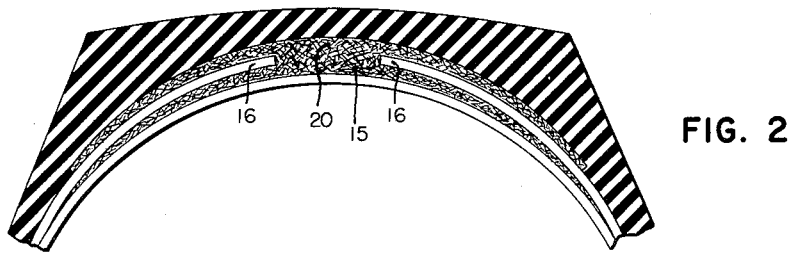
FIG. 2 is a fragmentary section of a similar construction in which the edges of the wide cord ply do not come together and there are short lengths of wire in rubber plies located both above and below the turned-up edges of the cord ply.

The tire of FIGURE 2 is constructed in a similar fashion except that there is a ply of rubber 15 containing short lengths of wire under the turned-up edges 16 of the wide ply 17 in addition to the ply 20 which contains filamentary material and is located above the edges 16. There is rubber containing short wires in the gap between the edges 16 which may be a separate ply or a part of one or both of the plies 15 and 20. (In an alternative structure a separate ply which fills the gap between the edges 16 contains no wire. It may contain short lengths of other filamentary material).

Filamentary materials of different compositions and different lengths may be used in the different locations; some may be orientated and some may be positioned in an entirely random arrangement.

Thus, the edges of the wide ply are held to one another and to the underlying central portion of the wide ply by a rubber ply which contains short wires. One wide ply with radial cords may be used, and generally its cords will be on the bias. Two wide plies with bias cords can be used, and then generally the cords in the two plies will be parallel with one another with the turned-up edges of the first ply at the opposite angle from the bias cords in the adjacent continuous portions of the two plies. Such long plies may be composed of heavy denier cords, such as 33/60/2 or 62/20/3 nylon.

The tire may be tubeless or designed for use with a tube.

The invention is covered in the claims which follow.

What we claim is:

1. A pneumatic tire with beads and a wide cord ply which is continuous from bead to bead, with the edges of this ply turned up outside of the beads and brought toward one another at the crown of the tire but with a gap between them, with a rubber ply containing short wire lengths with the wire ends protruding from the surfaces of this ply and with some wire ends anchored in said edges of the cord ply and other wire ends anchored in the underlying central portion of the cord ply and keeping said edges from separating from one another.

2. The pneumatic tire of claim 1 in which edges of rubber plies containing short wire lengths are in flat contact with both sides of each edge of the cord ply, and in which one of said plies containing short wire lengths is in flat contact with said underlying central portion of the cord ply.

References Cited in the file of this patent

UNITED STATES PATENTS 2,960,139     Engstrom et al. _____ Nov. 15, 1960

FOREIGN PATENTS 628,060     Great Britain _____ Aug. 22, 1949